United States Patent [19]

Koford et al.

[11] 4,377,862

[45] Mar. 22, 1983

[54] METHOD OF ERROR CONTROL IN ASYNCHRONOUS COMMUNICATIONS

[75] Inventors: James S. Koford, Sunnyvale; William C. Jensen, Palo Alto; Barry B. Woo, Sunnyvale, all of Calif.

[73] Assignee: The Boeing Company, Seattle, Wash.

[21] Appl. No.: 967,001

[22] Filed: Dec. 6, 1978

[51] Int. Cl.³ .............................................. G06F 11/10
[52] U.S. Cl. ..................................... 371/32; 364/200; 370/43
[58] Field of Search .............. 340/146.1 C, 146.1 AG, 340/146.1 BA; 179/15 BA; 364/200, 900; 371/32, 35, 49; 370/43

[56] References Cited

U.S. PATENT DOCUMENTS

| | | | |
|---|---|---|---|
| 3,412,380 | 11/1968 | Heller et al. | 371/37 |
| 3,646,518 | 2/1972 | Weinstein | 371/32 |
| 3,742,145 | 6/1973 | Clark et al. | 179/15 BA |
| 3,805,234 | 4/1974 | Masters | 340/146.1 C |
| 3,820,083 | 6/1974 | Way | 340/146.1 AG |
| 3,825,899 | 7/1974 | Haeberle et al. | 179/15 BA |
| 3,868,631 | 2/1975 | Morgan et al. | 340/146.1 AG |
| 3,975,712 | 8/1976 | Hepworth et al. | 340/147 R |
| 4,019,172 | 4/1977 | Srodes | 340/146.1 C |
| 4,064,370 | 12/1977 | Coonce et al. | 179/15 BA |
| 4,079,452 | 3/1978 | Larson et al. | 364/200 |
| 4,082,922 | 4/1978 | Chu | 179/15 BA |
| 4,126,764 | 11/1978 | Downey et al. | 179/15 BA |

FOREIGN PATENT DOCUMENTS 1299984  12/1972  United Kingdom .

OTHER PUBLICATIONS

Breslau et al., Cyclic Redundancy Check for SDLC Architecture, IBM Technical Disclosure Bulletin, vol. 19, No. 6, Nov. 1976, pp. 2098-2099.
Williams, Developments in Data Communications, Post Office Electrical Engineers Journal, vol. 64, No. 2, Jul. 1971, pp. 70-80.
Schwartz et al., Terminal-Oriented Computer-Communication Networks, Proceeding on the IEEE, vol. 60, No. 11, Nov. 1972, pp. 1408-1423.
S. B. Cooper, Hardware Considerations for High Level Data Link Control Communication, Computer Design, vol. 14, No. 3, Mar. 1975, pp. 81-87.

*Primary Examiner*—Charles E. Atkinson
*Attorney, Agent, or Firm*—David G. Pursel

[57] ABSTRACT

Error control, in the form of a modulo 2 division remainder checksum is added to a packet of reformatted asynchronous characters prior to transmission over a data link connecting two data devices such as a host computer and a teletype terminal. At one end of the link, data in asynchronous form, such as ASCII code, comprising seven data bits, start and stop bits, and a parity bit, is originated by one data device. The start, stop and parity bits of each character are eliminated. The remaining data bits for a selected number of characters are then grouped together to form a data grouping and the checksum and other control information bits added, forming an information packet. The information packet is then divided into sections or groups of eight bits. Start and stop bits are added to each group, forming ten bit characters. The ten bit characters are then transmitted over the data link in standard asynchronous format. The process is carried out in reverse at the other end of the link, resulting in the other data device receiving the data in the form originated by the first data device. Sophisticated error control techniques thus may be implemented in asynchronous communications without detrimentally affecting the data capacity of the channel.

26 Claims, 5 Drawing Figures
Microfiche Appendix Included
(Eight microfiche, 489 pages)

METHOD OF ERROR CONTROL IN ASYNCHRONOUS COMMUNICATIONS

This specification includes a program listing contained in a microfiche appendix. The microfiche appendix includes a total number of eight microfiche with a total number of 489 frames.

BACKGROUND OF THE INVENTION

This invention primarily concerns the art of asynchronous communication, and more particularly relates to a method of providing error control for asynchronous communications.

Historically, asynchronous communication has been low speed, on the order of 5 characters per second (cps) to 30 cps, assuming ten bit characters. An example of equipment using asynchronous communication is the well-known teletype machine. Companion transmission line devices, such as multiplexers and modulator/demodulators (modems), are available which operate at similar speeds.

In asynchronous communication, data is transmitted on a character by character basis, and synchronization is achieved between transmitter and receiver on a character basis by the start and stop bits positioned at the start and end of each data character. Different data code formats utilize a different number of data bits per character. For instance, the ASCII code uses seven data bits, the start and stop bits, and a parity bit to form its 10 bit characters.

Heretofore, there has been no error control utilized in asynchronous communication, except for the parity bit in the ASCII code, which results only in an elementary form of error check. This lack of error control in asynchronous communication is in contrast to the rather complex error control techniques which have been developed for synchronous communication.

In synchronous communication, higher data rates, i.e. 200-1200 cps, are used, and the synchronization between transmitter and receiver is achieved by synchronized clocks at the transmitter and receiver. Sophisticated error control techniques have been developed and used in synchronous communication because of the high error rate present at such high speeds. Only synchronous equipment, which is large and expensive, has had error control capability in the past. In asynchronous communication, the error rate has historically been relatively low, on the order of one error or less per page of text. Furthermore, errors in asynchronous communication were usually not very serious, as such communication usually involved just text data, to be read by a human being. Errors could thus be relatively easily detected, and corrected by the user.

However, errors in asynchronous communication are now becoming increasingly intolerable, due to several technical developments in the art. Higher transmission speeds, e.g. 120 cps, are now becoming common, but with a corresponding significant increase in errors. Additionally, graphic type data is being transmitted asynchronously, in which even a single bit error can have very serious consequences. Furthermore, files are being transferred between computers asynchronously, and in such a case, errors cannot be easily discerned and corrected by a human operator.

The parity bit error control techniques is not sufficient to achieve the quality of error control necessary with such technical developments, while the more sophisticated error control techniques used in synchronous communication, which add between 8 and 32 bits to a data burst, are not feasible with the current character-by-character asynchronous form of data transmission. Adding error control bits to existing character-by-character asynchronous communications would seriously degrade the data capacity of the communication system, which is an unacceptable result.

Thus, there is a significant need for a reliable, sophisticated error control technique would can be used in asynchronous communications, but which does not result in a reduction in the data capacity of the communication system. Also, it is desirable that the apparatus for implementing such an error control method be useful which existing asynchronous data devices, such as teletypes and modems, while being transparent to the user and host devices and the transmission line data link, so that no modification of such devices, or the data link, is necessary.

Accordingly, it is a general object of the present invention to provide a method of error control for asynchronous communication which overcomes one or more of the disadvantages of the prior art noted above.

It is another object of the present invention to provide such a method which results in a high level of error detection and correction in asynchronous communication.

It is an additional object of the present invention to provide such a method which can be used with existing data links and with existing asynchronous communication equipment, without modification of either.

It is a further object of the present invention to provide such a method which does not reduce the data capacity of the communication system.

It is yet another object of the present invention to provide an apparatus implementing such a method which is transparent to both of the user devices and the data link.

It is a still further object of the present invention to provide such a method which permits encryption of the asynchronous data.

It is an additional object of the present invention to provide such a method which is useful at all of the present asynchronous communication rates.

It is yet another object of the present invention to provide such a method which is useful with most, if not all, existing asynchronous communication equipment.

It is a still further object of the present invention to reduce the time lag between the generation of data by a data device and the transfer of that information to the transmission line.

SUMMARY OF THE INVENTION

Accordingly, the present invention is a method of formatting data which permits the addition thereto of control information for asynchronous data transmission, in which method the data is initially in a first format of a sequence of original asynchronous characters which comprise a start bit, a predetermined number of data bits, and a stop bit, wherein the method comprises the steps of, at the transmission end of the link, (a) receiving a succession of original asynchronous characters, (b) removing the start and stop bits from a number of successive original asynchronous characters received; (c) bunching together into a single group the remaining data bits of the number of asynchronous characters; (d) adding error control information to the single group of data bits, thereby forming an information packet; (e)

dividing each information packet into successive groups of bits; (f) adding start and stop bits to each group of bits, so that each such group of bits is a reformatted asynchronous character; and (g) transmitting said reformatted asynchronous characters. At the receiving end of the transmissions link, a reverse conversion occurs from the reformatted asynchronous characters to the original asynchronous characters. The invention also includes the data format, per se, for asynchronous communications, wherein information is transmitted over a transmission line between a first data device and a second data device as a series of information packets. The format is a serial bit of data characters, wherein each data character comprises a start bit, a plurality of information bits, and a stop bit, wherein the information bits in particular ones of the data characters in a given information packet comprise data and the information bits in the remaining data characters in the given data packet comprise control information.

DESCRIPTION OF PREFERRED EMBODIMENT

The apparatus which is used to carry out the method of the present invention is referred to hereinafter as a terminal service unit (TSU) and is designed to be integrated into conventional asynchronous data links, without modification to either the transmission line or any of the other asynchronous communication devices in the link.

Figure 1:
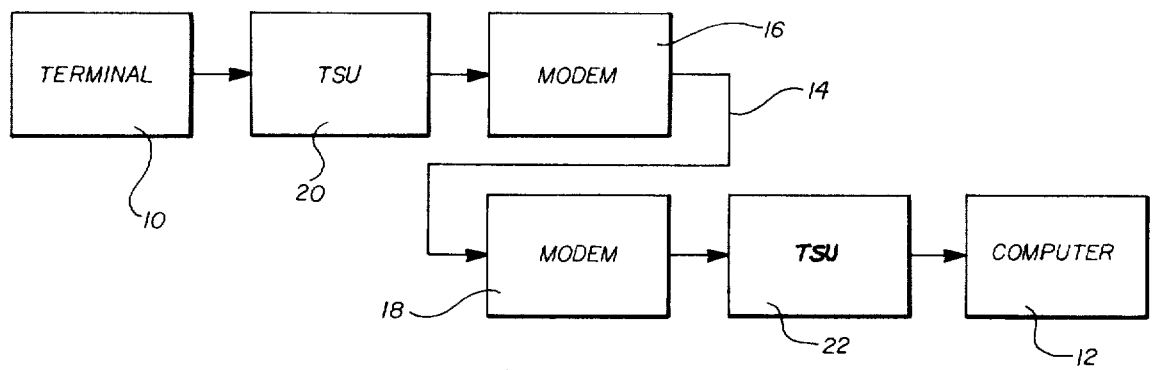
FIG. 1 is a schematic block diagram showing the apparatus which implements the method of the present invention in the environment of an asynchronous data communication link.

FIG. 1 shows in schematic form how the apparatus is integrated into a given asynchronous data link. In FIG. 1, an asynchronous terminal device 10, such as a standard teletype machine, communicates with a host computer 12 over a transmission line 14 at standard asynchronous rates, e.g. 30 cps. The transmission line typically is a conventional telephone line, capable of handling full duplex (i.e. simultaneous two-way) communication.

Between the terminal 10 and the transmission line 14, as well as between the host 12 and transmission line 14 are a pair of modulator/demodulator (modems) 16 and 18, each of which modulate or demodulate the data applied to it, depending on the direction of the data. Additional devices, such as multiplexers and encrypt/decrypt devices, may be on the data link. These devices are, however, specifically designed to handle information at asynchronous speeds.

Such asynchronous data devices are usually designed to operate at particular set speeds, e.g. 5, 15 or 30 cps. This is sometimes referred to as the bandwidth of the system but more accurately refers to the data transmission capacity of the system. If, for instance, the transmitting data device and its modem are designed to handle a maximum data rate of 30 cps, information cannot be transmitted through the system faster than that rate, even though data may be available for transmission and the transmission line may be capable of handling higher rates.

The apparatus which implements the method of the present invention is referred to as a TSU, as mentioned above. The TSU units must be used in pairs on a data link to achieve the advantages of the present invention. Each TSU is associated with a data device and is positioned between that device and the other communication devices, such as the modem, associated with the data device.

In FIG. 1, TSU 20 is positioned between terminal device 10 and modem 16 while TSU 22 is positioned between computer 12 and modem 18. Each TSU is capable of both transmitting and receiving asynchronous communications, and is transparent to the data link. Thus, the appearance of the data presented by TSU 20 to modem 16 will be the same as the appearance of the data presented to the TSU by the terminal device 10.

The information presented to the TSU from the terminal device 10 is in conventional asynchronous coded format, e.g. ASCII code, which comprises a series of 10 bit characters, each character having 7 data bits, a parity bit and start and stop bits. The information at the transmission line side of the TSU, however, while also being 10 bit characters having start and stop bits and thus having the same appearance as the terminal side information, may contain either data or control information and sometimes both. The control information, when present, relates to a selected group of individual characters, as will be explained hereinafter.

Figure 2:
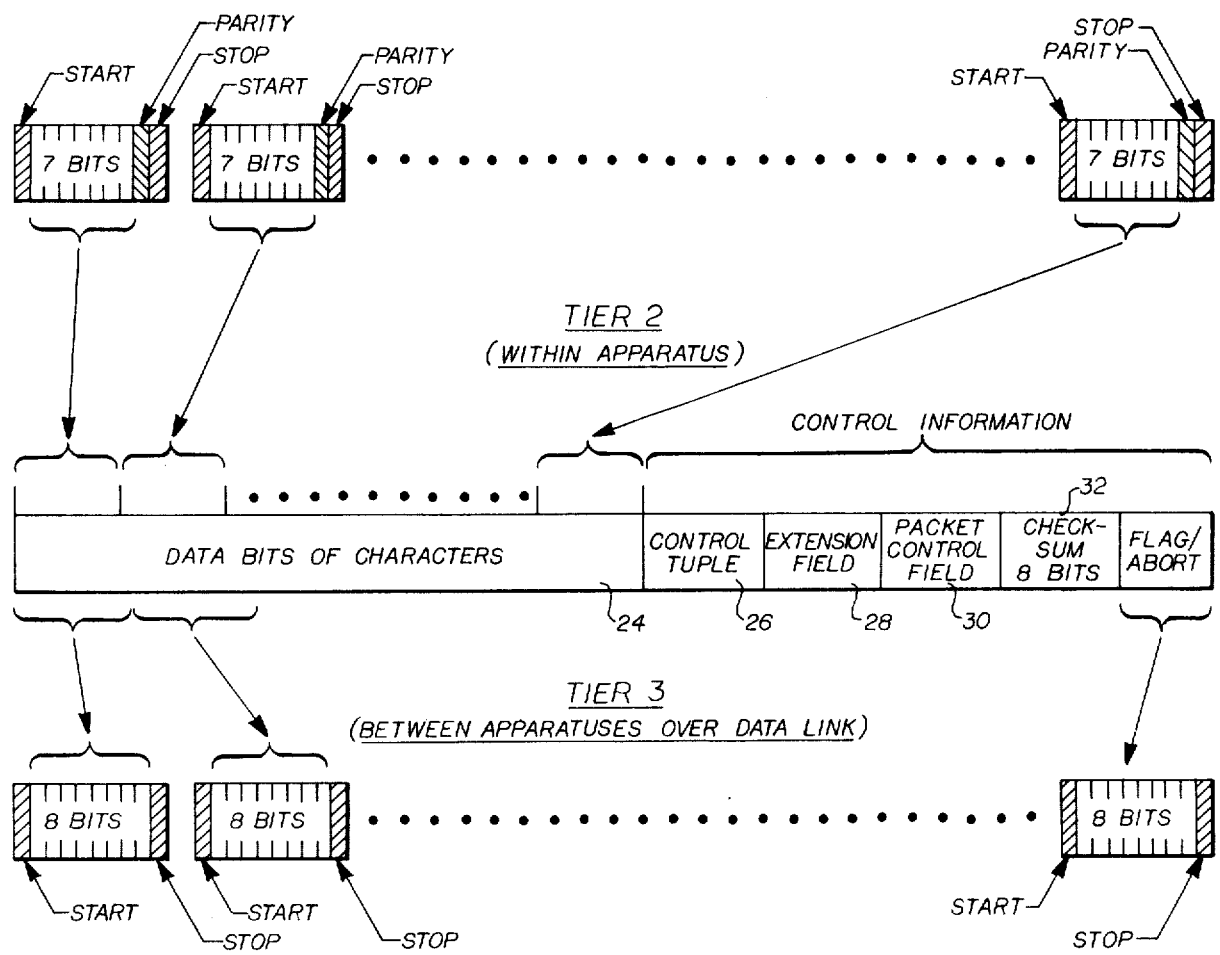
FIG. 2 is a diagram showing the three different tiers, or formats, through which data progresses in the method of the present invention.

FIG. 2 shows in more detail the data reformatting process carried out by the TSU which permits the addition of control information, such as error control, to an asynchronous data transmission without reducing the data capacity of the communication system.

Referring to FIG. 2, tier 1 is representative of the conventional format of asynchronous information transmission, and is the coded format used in transmitting information between the TSU and its associated data device. The diagram shown in tier 1 represents a succession of characters, in standard code format, delivered to the TSU by its associated data device. The characters shown in tier 1 of FIG. 2 are in standard ASCII code so that each character comprises 10 bits, including 7 bits of data, start and stop bits, and one parity bit.

As the characters are presented to the TSU, the start, stop and parity bits of each 10 bit character are stripped off, and the remaining seven bits of data from each character are bunched together serially to form a data grouping referred to herein as a group of seven tuples, meaning a group of seven-bit blocks of data. This group of data is shown by the numeral 24 in FIG. 2. The number of original characters having data in region 24 is determined dynamically by a packetizing algorithm, which will be discussed in more detail hereinafter. In the embodiment shown, the number of characters in the data grouping may vary between zero (only control information is sent in the packet) and 64. Each character has 7 data bits, so if a given data group portion of a packet has 40 data characters, for example, as determined dynamically by the algorithm, the data group portion of the packet would comprise 40×7=280 bits.

Control information is then added to the end of the 7-tuple group to form what is referred to as an information packet. The presence of control information in a packet is indicated by the message length not being equal to an integral multiple of seven, the character length in the data grouping, plus four. This feature eliminates the need for an extra bit to indicate the presence of control information.

The control information is divided into sections. The first section of control information, denoted by the numeral 26 in FIG. 2 is a 7 bit control tuple field. The control tuple is an optional section and comprises a three bit type code followed by a four bit function code. The control tuples are used for protocol exchange between TSUs, such as connect and disconnect procedures.

The next section is referred to as the extension field and is identified by the numeral 28 in FIG. 2. The extension field, like the control tuple field, is not required in every tier 2 frame. The extension field comprises three one bit subfields. The first subfield is an extension NAK position, which, when set, indicates an error in a particular information packet which has been received from the other TSU. The second subfield is for an extension break, which, when set, indicates that a break signal is to be sent following delivery of the 7 tuple data in the packet being transmitted. The break signal holds the transmission line in the one state for an extended period of time, e.g. 250 milliseconds. The last position is an extension escape position which, when set, indicates that a control tuple is present in the packet.

The next section is a packet control field 30, which is mandatory in each packet and contains the control bits by which acknowledgement and synchronization of the information packets is accomplished between the TSUs. The packet control field comprises two three bit fields, referred to as packet number sent (PS) and packet number received (PR). Although these fields will be described in more detail hereinafter, the packet number sent (PS) in a particular packet identifies that packet in the sequence of packets being transmitted, while the packet number received (PR) in a packet is the number of the latest packet received and verified from the other TSU.

Following the packet control field 30 is a checksum field 32 which comprises the error control information in the embodiment shown for the packet. Although various checksum techniques may be utilized in the method of the present invention, the checksum 30 is the remainder of modulo 2 division of all the bits in the packet by a generator polynomial. This remainder checksum is an error control technique which is well known in synchronous communications. An explanation of this technique for error control may be found in the book titled "Error Correcting Codes," by W. W. Peterson, MIT Press, Cambridge, Massachusetts, 1961.

The particular polynomial used in the present invention is $X^{16}+X^{12}+X^5+1$. The remainder resulting from the division of the bits in the packet by the polynomial, through modulo 2 division, is a sixteen bit number, which forms section 32 of the tier 2 format of FIG. 2.

At the other TSU the number of bits in each packet, including the checksum, are divided modulo 2 by the same polynomial. If the remainder resulting from this division is zero, a valid packet has been received. If not, there has been an error, and the negative acknowledgement-retransmission error correction system will go into effect.

The checksum field in a packet sent by a TSU is also used to differentiate a packet sent by a remote TSU and one sent by itself. A fixed bias or initialization is added to the checksum field for outgoing packets, so that sent packets erroneously returned due to shorts, etc. can be distinguished easily from packets from a remote TSU.

The final field in each packet is an eight bit sequence which is either a flag or abort bit sequence. The end of a valid packet is signaled by a sequence of bits referred to as a flag, which in the embodiment shown is defined as the binary sequence 01111110. The bit sequence defining an abort is a string of seven or more contiguous one bits, which is an instruction to the receiving TSU to ignore and discard information in the partial packet which has preceded it.

The existence of abort and flag sequences, however, raise the possibility of a misinterpretation of otherwise accurate data or control information in the packet. The presence of six or seven contiguous valid one bits within the body of the packet would otherwise be interpreted to be a flag or abort sequence. To prevent the inaccurate interpretation of a legitimate string of six or seven one bits as a flag or abort, a bit stuffing technique is utilized.

A conventional bit stuffing algorithm similar to that established by the Advanced Data Communication Control Procedures (ADCCP) standard is followed. The algorithm is as follows: The transmitting TSU will insert a zero bit following a string of five contiguous one bits anywhere within the particular packet, through the checksum field. The receiving TSU, upon detection of five contiguous one bits received from the transmitting TSU, will inspect the following bit. If the following bit is a zero, the five one bits are passed as legitimate data and the zero bit is deleted. If the sixth bit is a one, however, the receiver inspects the seventh bit. If that bit is a one also, then the receiver knows that a proper abort sequence has been received. If zero, then a flag has been received. The implementation of this algorithm is conventional and may be routinely accomplished by a skilled programmer.

The combination of the 7-tuple data group 24, the control tuple 26 (if any), the extension field 28 (if any), the packet control field 30, the checksum field 32, and the flag or abort field 34, along with bit-stuffed zeros (if any), forms one packet in the tier 2 format.

This tier 2 packet is then broken down into successive sections, each section comprising 8 bits. A start and stop bit is then added to each section, forming ten bit characters, which thus have the exterior appearance of tier one characters. If the length of the tier 2 packet is not an even multiple of 8 bits, the partially completed last character may be filled with either the first 1-7 bits of the next packet, if available, or an abort sequence.

These ten bit characters, which form the tier 3 format, are then delivered to the line equipment side of the TSU for transmission over the line. Thus, the TSU appears transparent to the transmitting data device, the other data devices, and the transmission line. The reformatting, from tier 1 to tier 3, results in the inclusion of sophisticated error control in asynchronous communications, on a packet-by-packet basis, without decreasing the data capacity of the system.

The addition of error control without reducing data capacity results from the elimination of the parity bit from each original character in the packet. For instance, in a 40 character packet, 40 parity bits will be eliminated. The control tuple, if present, will add seven bits, the extension field, if present, will add three bits, the packet control field will add six bits, the checksum field will add sixteen bits and the flag/abort field will add eight bits. The control fields thus will add a total of 40 bits to the packet, which is no more than the bits deleted by the parity bits. Although the number of characters in a given packet may vary widely, i.e. from 0 to 64, the average number of characters per packet in a given transmission should be high enough that the data capacity of the system is not decreased by the addition of control information.

Thus, by (1) packetizing a series of conventionally coded characters, (2) adding control information, including error control, to that packet, and then (3) regrouping that packet in ten bit characters, each having a start and a stop bit, a system for asynchronous data communication is achieved which has sophisticated error control but does not decrease the original data capacity of the system.

At the receiving end of the link, the incoming characters, in a tier 3 format, are processed on a packet-by-packet basis and initially reformatted into a tier 2 format by stripping off the start/stop bits and bunching all the resulting information, both data and control, together. Acknowledgement and retransmission (if necessary) functions then occur.

Once a packet of data is validated, the control tuple field 26, the extension field 28, the packet control field 30, the checksum field 32 and the flag/abort field 34 are stripped off, and the remaining data bits are then reformatted into a tier 1 format, i.e. ten bit characters comprising 7 data bits, and parity, start and stop bits for ASCII coded information, and transmitted to the receiving data device. The information thus applied to the receiving data device thus is in exactly the same format as it was when it left the originating data device.

Figure 3:
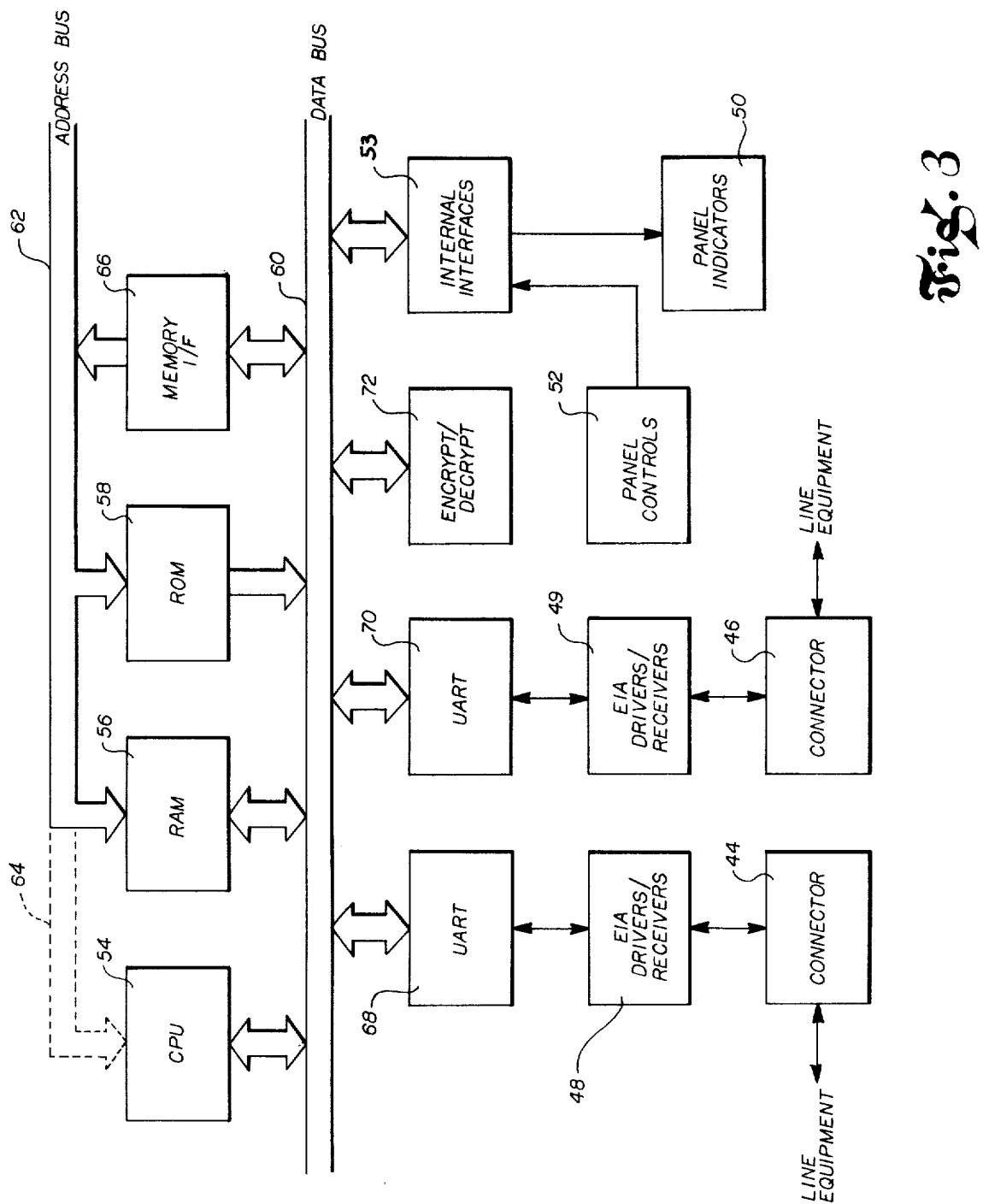
FIG. 3 is a block diagram of the hardware realization of the apparatus which carries out the method of the present invention.
Figure 4:
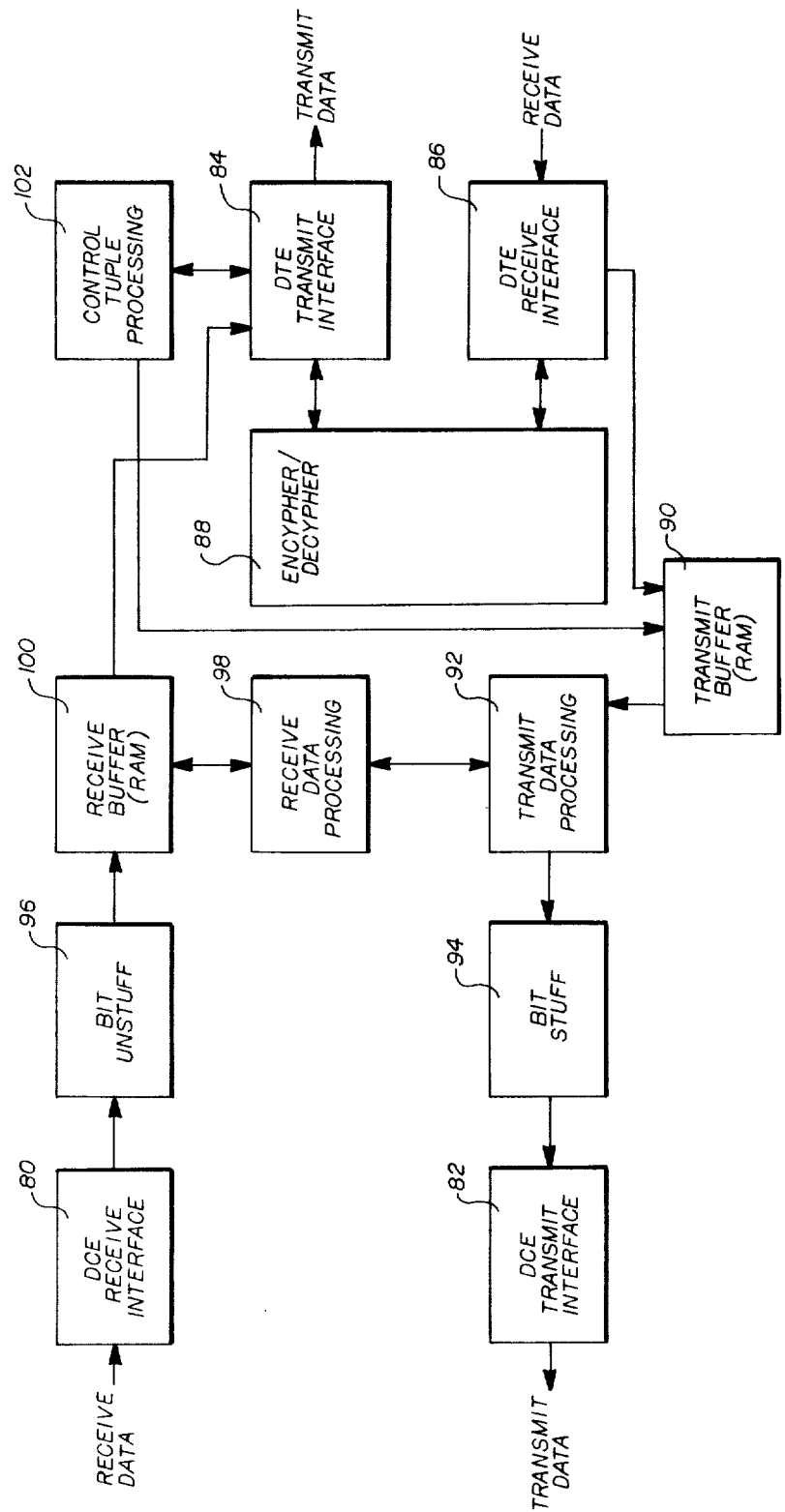
FIG. 4 is a block diagram showing the flow of data information within the apparatus.
Figure 5:
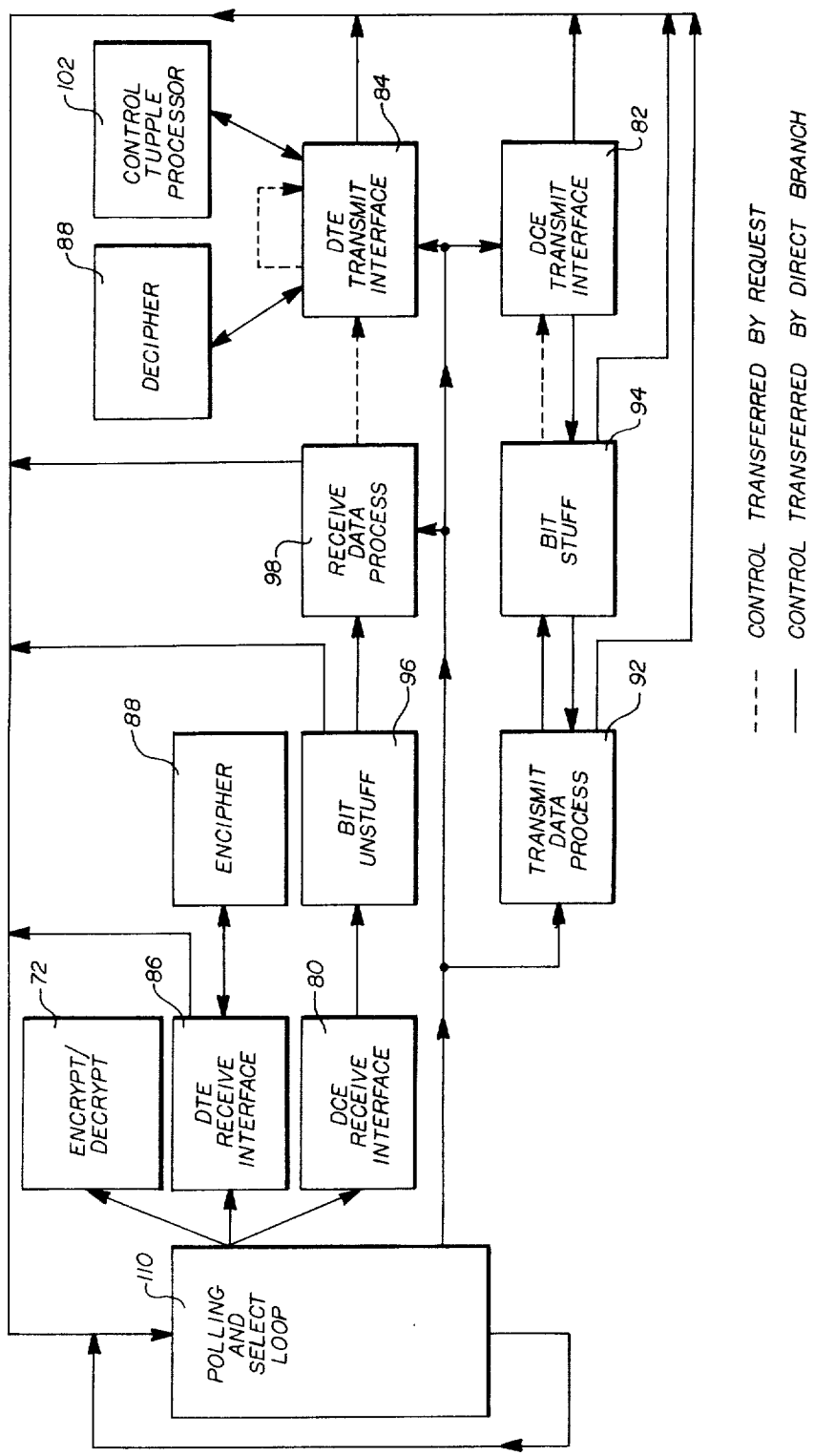
FIG. 5 is a block diagram showing the flow of operational control within the apparatus.

The TSU accomplishes the above functions through acombination of hardware and firmware which is shown in the block diagrams of FIGS. 3, 4 and 5. Referring now specifically to FIG. 3, the hardware architecture of the TSU is shown. The individual elements disclosed are per se conventional and may be purchased under the nomenclature used in FIG. 3, but are organized in a specific combination which makes possible the flow of data and control necessary to carry out the method steps disclosed above.

Input and output of the TSU is achieved through conventional RS 232 connectors 44 and 46 which conform to specific standards developed by the electronics industries association (EIA) and are available from several manufacturers under the above nomenclature.

The connectors 44 and 46 interface the data device with EIA driver/receivers 48 and 49. The driver/receivers 48, 49 are conventional hardware devices which perform voltage level and impedance translations between the TSU and the modem. The combination of connectors 44 and 46, and driver/receivers 48 and 49 is used in some form by every communication device which forms a part of a data link. Such devices are conventional, and for the most part are now standardized, such as by the EIA standards.

TSU control and display may be obtained from the front panel of the unit, as shown in FIG. 3, by virtue of panel indicator block 50 and panel control block 52. The panel indicators and panel controls 50 and 52 interface with the remaining circuitry of the TSU through conventional hardware internal interfaces 53. Visual indications of various TSU operating conditions are thus provided. Likewise, an operator has the capability of controlling the operating condition and mode of the TSU through the control block 52, which includes the front panel switches on the TSU.

The remaining blocks in FIG. 3 are the primary hardware blocks comprising the TSU. Central processing (CPU) unit 54 is an eight bit or sixteen bit microprocessor with a fixed instruction set. The instruction set and the instruction cycle time are such that CPU 54 is capable of processing the firmware present in the TSU.

The random access memory (RAM) 56 is a memory section which provides up to 15 seconds of temporary storage (buffering) of data received by the TSU at a 120 cps rate. RAM 56 is compatible with the microprocessor comprising CPU 54 and may be any one of various available low cost semiconductor RAM memories.

Read only memory (ROM) 58 is a low cost, high density semiconductor memory, having access time and power requirements compatible with the CPU microprocessor 54. ROM 58 contains the firmware which is used by CPU 54 to process, i.e. reformat, the incoming data stream which has been temporarily buffered in RAM 56, in a manner described above and in more detail hereinafter.

ROM 58, RAM 56 and CPU 54 are linked together in conventional fashion via data bus 60 and address bus 62 to permit the processing of data. In operation, instruction words in the firmware from ROM 58 are fetched sequentially by the CPU 54 at the clock rate established in the CPU, and are routed along the data bus 60 to the CPU for execution. The instructions fetched from ROM 58 are selected over an address bus 62 which can directly connect the CPU 54 and the ROM 58 as shown by the dotted line section 64 or indirectly through the combination of memory interface unit 66, address bus 62 and data bus 60.

Communication between the processing portion of the TSU, i.e. CPU 54, RAM 56, ROM 58, data bus 60 and address bus 62, and the interface circuitry, i.e. connectors 44 and 46 and driver/receivers 48 and 49 is accomplished through a pair of universal asynchronous receiver/transmitter (UART) integrated circuit devices 68 and 70. UARTs 68 and 70 perform a serial-to-parallel, and vice versa, bit conversion. Data communications over telephone lines is bit serial, i.e. a series data stream of binary ones and zeroes. This results in a transmission of data on a serial character-by-character basis when proper start and stop bits are included. The processing and manipulation of data within a microprocessor, however, is more efficiently done on a byte (8 parallel bits) basis. The UART's 68 and 70 are conventional hardware devices, available from several manufacturers and convert the data from a serial to parallel arrangement and vice versa. Thus, the UART's also perform an interface function between the TSU and the transmission line.

The remaining block in the TSU is the encryption/decryption hardware block 72 which is a commercially available device which implements the U.S. Department of Commerce National Bureau of Standards data encryption algorithm. In operation, block 72, using a secret key, performs an encryption function on 8 known characters to produce a series of encipering characters used by a firmware block operating in what is known as cipher feedback mode to produce, through an exclusive OR gate arrangement, ciphertext characters from plaintext. Further explanation concerning the enciphering-/deciphering mode of the apparatus will be provided hereinafter in the section concerning the system firmware.

A specific structural implementation of the more generalized block diagram of FIG. 3 can be accomplished with a Fairchild F8 microprocessor. In the F8 microprocessor, a 3850 CPU is driven by a 2.000 megahertz crystal clock. Associated with the 3850 CPU are two 3861 PIO's (peripheral input/output) and a 3853 SMI (static memory interface). Comparable devices are available from other manufacturers. RAM 56 consists of eight low power 1K×4 static RAM chips (2114L's) while ROM 58 comprises four 2K×8 static EPROM's (2716E'S).

These devices are linked together by an F8 bus which consists of eight bidirectional data lines, five control lines and two clock lines. The parallel to serial conversion function is implemented by two SMC COM 2502 UART's. The necessary voltage and impedance translations are accomplished through using MC1489 quad line receivers and MC1488 quad line drivers.

Although the apparatus has a substantial amount of hardware, a considerable portion of the actual operation of the apparatus is carried out in the preferred embodiment by what is referred to as firmware. Firmware is a term of art which refers generally to a set of instructions for use in processing data which are written permanently into memory, such as a read only memory (ROM). The instructions are thus virtually hardwired into the apparatus. The same logic functions accomplished by the CPU 54 acting on the data stream with the firmware can, of course, be implemented with hardware logic circuits, although such an embodiment would be quite bulky and expensive.

The firmware used in the present invention is clarified in FIGS. 4 and 5, which show, respectively, the movement of data between the firmware modules, and the movement of processing control between firmware modules. Referring now in particular to FIG. 4, interfaces 80 and 82 are the receive and transmit interfaces on the transmission line side of the TSU, referred to as the data communications equipment (DCE) receive and DCE transmit interfaces, respectively. On the other side of the TSU are interfaces 84 and 86, which are the receive and transmit interfaces on the data device, i.e. terminal or host computer, side of the TSU, referred to as the data terminal equipment (DTE) receive and DTE transmit respectively. The listings for the interface firmware, i.e. for firmware modules 80, 82, 84 and 86 appears in the microfiche appendix. The function of each interface is explained in the following paragraphs.

DCE receive interface 80 controls the movement of tier 3 information between the receive buffer in the line equipment UART and the bit unstuff module 96. Information moves from the buffer in the UART to the interface 80, and then to the bit-unstuff module 96 when processing control shifts to that module.

DTE transmit interface 84 controls movement of tier one information between receive buffer 100 and the transmit buffer in the UART on the data device side of the TSU. When the transmit buffer in the UART has available space, tier one characters move from receive buffer 100 to the UART through interface 84. Any control tuples, however, are routed to the control tuple processing module 102.

DTE receive interface 86 controls movement of tier one information between the receive buffer in the data device side UART and the transmit buffer 90 or the encipher/decipher module 88. When a character is available at the receive buffer in the UART, it is delivered either directly to transmit buffer 90, or first to module 88 and then to buffer 90.

DEC transmit interface 82 controls the flow of tier 3 information between the bit stuff module 94, and the transmit buffer of the line equipment side UART. When the transmit buffer is empty, data in eight bit groups, from module 94, is supplied to it.

Thus, in one direction of information flow, data in a tier one format is originated at a user data device such as a terminal or host computer, proceeds through interface 86, then through encipher/decipher module 88 if necessary, then to transmit buffer 90. Transmit buffer 90 forms part of RAM 56, which is hardware, but is shown in FIG. 4 for clarity of explanation.

Module 88 implements the encipher/decipher functions of the apparatus. It includes registers which store known characters which are delivered periodically to the encrypting hardware (block 72 in FIG. 3) to produce the enciphering/deciphering characters which are then used by the encipher/decipher firmware module 88 to produce ciphertext from plaintext and vice versa, by exclusive ORing the plaintext data in the packets with the encipher/decipher characters. The result of the exclusive ORing is also shifted back into the registers to form new known characters. This is a known technique and is referred to as cipher feedback mode. The cipher feedback mode technique is described in detail in a publication of the U.S. Department of Commerce, National Bureau of Standards, Federal Information Processing Standards (FITS), Publication 46.

From transmit buffer 90, the tier one data (enciphered, if desired) is delivered to the transmit data processing firmware module 92, which in operational terms is the CPU 54 operating with the firmware of module 92 stored in ROM 58. Operationally, firmware module 92 concurrently removes characters from transmit buffer 90, initiates reformatting and packetization, and sends the resulting information to bit-stuff module 94. Packetization, i.e. determining the cut-off point for the number of characters from the transmit buffer 90 in the packet being formed, occurs when either (1) there are no characters awaiting transmission in the transmit buffer 90 or (2) the maximum packet size of 64 characters has been reached.

After packetization occurs, the control information for the packet is computed by module 92 and this information is then sent to the bit stuffing module 94. The listing for firmware module 92 appears in the microfiche appendix. As the characters from transmit buffer 90 and the control information computed by transmit data processing module 92 are acquired by module 94, the bit-stuffing algorithm described above is implemented. The listing for the bit-stuffing module likewise appears in the microfiche appendix.

The data emerging from the module 94, which in a given packet will be character or control information, now in tier 3 format, is ready to be transmitted through interface 82 to the transmit buffer of the line equipment side UART. From the UART, the data is delivered through various hardware interfaces to the other devices, such as modems, prior to the data going out on the transmission line to a distant TSU. The data characters originally present in transmit buffer 90 remain there until an acknowledgement is received from the other TSU. When the acknowledgement is received, that space is cleared for more characters from the user data device.

In the other direction, i.e. from the distant TSU over the intermediate transmission line, data ia delivered through the line equipment (i.e modem) and the hardware interface to interface 80, which forwards it to bit unstuff module 96, when that module has process control. In bit-unstuff module 96, the stuffed bits are eliminated. The listing implementing the algorithm likewise appears in the microfiche appendix.

As the stuffed bits are removed from the incoming packet, the data is stored in receive buffer 100, which is another part of RAM 56. This data is then processed by the receive data processing module 98. The packet control field numbers and checksum fields are examined by the firmware module 98 to determine the validity of the packet. An appropriate signal is then sent to transmit data processing module 92 to cause an acknowledgement (ACK) or negative acknowledgement (NAK), as appropriate, to be sent to the other TSU. The acknowledgement information contained in the received packet is then used to initiate release of storage in transmit buffer 90, for an ACK, or a retransmission for a NAK.

The 7 tuple data remaining is then released for later delivery by the DTE transmit interface 84. The listing for the receive data processing module 98 appears in the microfiche appendix.

Concurrently with reception of the next packet from the remote TSU, the DTE transmit interface 84 will access characters in sequence from buffer 100, route them to module 88 for deciphering, if necessary, append start, stop and parity bits, and then deliver the resulting characters to the transmit buffer of the UART on the data device side of the TSU.

When a control tuple is recognized in buffer 100, it is sent to control tuple processor module 102. Control tuple processing module 102 processes and carries out all of the control tuple requests received from the distant TSU. If a response is necessary, the proper response is routed to the transmit data processing module 92 for inclusion in the next packet to be transmitted. The listing for the control tuple processing firmware appears in the microfiche appendix to the application.

The flow of process control between the various firmware blocks is shown in schematic form in FIG. 5. The flow of control is achieved primarily through a central polling and selection loop 110.

The loop 110 scans several modules in a priority sequence, including the encrypt/decrypt hardware module 72, DTE receive interface 86, and the DCE receive interface 80. A lower priority selection sequence includes the transmit data processing module 92, the DTE transmit interface 84, and the DCE transmit interface 82.

Whenever the encrypt/decrypt hardware module 72 is not busy, and data is ready to be deciphered or enciphered by the encipher/decipher module 88, control is transferred to the encrypt/decrypt hardware 72 to develop new enciphering/deciphering characters for use by the module 88. After the module 72 is started, control returns to the polling loop 110.

If the encrypt/decrypt hardware 72 is not busy, and there is no data to be enciphered/deciphered, the buffer in the UART associated with the DTE receive module 86 is then scanned to determine whether data is available there. If so, the DTE receive interface 86 is given control to read a character from the buffer in the associated UART, encipher it if necessary, and then store it in transmit buffer 90 (FIG. 4).

Next, the buffer in the UART associated with the DCE receive module 80 is scanned to determine whether data is available there. If data is available, control is passed to the DCE receive interface module 80, which reads the received character from the buffer in the associated UART.

Control is next transferred to bit unstuff module 96 which removes any zeros added by the bit-stuff algorithm at the remote TSU, groups the received bits into 7-tuples and stores them in the receive buffer 100 (FIG. 4). The bit unstuff module also scans for a flag sequence indicating the end of a packet and if one is sensed, transfers control to the receive data processing module 98. If a flag is not sensed, control returns to the polling loop 110.

The receive data processing module 98 processes received characters and control information, and if characters or a control tuple is present, sets a request flag to signal the polling loop 110 that the DTE transmit interface is to be given control. Processing control is then returned to the polling loop 110.

The processing request flags are now examined by the polling loop 110 in a priority order. If a flag is set, that module is given control. For instance, if interface 84 is requested and its associated UART's transmit buffer is empty, the DTE transmit interface module 84 is given control. This routine accesses a character from the receive buffer 100, passes control to the decipher portion of module 88 to decipher the character, if necessary, and delivers the character to the transmit buffer in the associated UART. The module then sets its own request flag, causing it to be re-entered when the UART transmit buffer is again empty. If the accessed character is a control tuple, it is not delivered to the UART but control is given to the control tuple processing module 102. If no character is awaiting delivery from module 98, control is returned directly to the polling loop 110.

Again at the polling loop 110, if the request flag for the transmit data processing module 92 is set (which occurs when the TSU is idling), that module is given control. The transmit data processing module 92 checks the transmit buffer 90 (FIG. 4) for characters stored by the DTE receive interface module 86, which characters are thus awaiting transmission. If a character is found, it is processed, i.e. reformatted, into a 7-tuple, and control is passed to the bit-stuff module 94, which inserts zeros, as required, by the bit-stuffing algorithm described earlier. When 8 bits have been prepared for transmission, the bit-stuff module 94 sets a request flag for the DCE transmit interface module 82, and control returns to the polling loop 110.

Again at the polling loop 110, if the DCE transmit interface module 82 is requested and the transmit buffer in its associated UART is empty, the DCE transmit module 82 is given control. This routine accesses the character provided by bit stuff module 94, and delivers it to the transmit buffer in its associated UART. Control is then passed to bit stuff module 94, which then continues the bit-stuffing algorithm on the remaining bits received from the transmit data processing module 92, until 8 bits are again ready for transmission.

The DCE transmit interface 82 is again requested to deliver these bits when the transmit buffer of its associated UART is empty. If, as is likely, the bit-stuff module 94 runs out of bits before 8 bits are ready for transmission, it immediately transfers control to module 92 which in turn acquires the next information to be transmitted and then returns control to the bit stuff module 94, which can then complete the bit-stuffing process on an 8 bit group of data and request the DCE transmit interface module 82.

This process continues, with control flowing between firmware modules 92, 94 and 82 as characters and control information are accessed from the transmit buffer 90, processed and transmitted. When the transmit data processing module 92 senses that no further data is awaiting transmission, control is returned to polling loop 110.

The flow of processing control within the TSU and the related flow of data is initiated during the connect procedure, continues through the exchange and processing of asynchronous information with a distant TSU and terminates at disconnect. The operational sequence of the TSU is explained in more detail in following paragraphs.

The TSU will initially pass through a connect sequence which is accomplished through an exchange of control tuples, without data. Then normal data exchange operation occurs, with error control, including acknowledgement, negative acknowledgement, and retransmission, if necessary. Following the completion of data communications, a disconnect sequence is followed, which again is accomplished through an exchange of control tuples.

When a terminal user initially dials into a host, it is not known whether the host has a TSU, and vice versa. In the connect procedure, the first priority is to determine whether a TSU exists at both ends of the link. If not, the one TSU on the link remains in its initial "wire-through" mode, which is essentially a by-pass of the TSU. In the wire-through mode, the data has the same format and content existing as entering. Thus, the TSU remains invisible to both the transmission line and its associated equipment.

At the start of the connect sequence, the TSU's are in a wire-through mode. The terminal operator will first dial into the terminal's associated modem. The operator will then type a known start or link-up character. The local, i.e. terminal side, TSU will see the character, which is representative of the type of terminal and transmission speed, and will set the characteristics of its DTE and DCE interfaces accordingly.

The terminal side TSU will then transmit a corresponding start character down the line to the host side TSU. When the host side TSU receives the character, it sets its DCE and DTE interfaces accordingly and then transmits a particular declaration sequence back down the line to the terminal TSU. The start character received by the host side TSU is saved or later transmission to the host.

The declaration sequence is a unique string of characters, which, when recognized by the terminal side TSU, indicates that a TSU-equipped host port has been reached. Upon receiving the sequence, the terminal side TSU transmits the same sequence back to the host side TSU, thus informing the host side TSU of its presence. Both TSU's now know that a dual TSU link has been achieved.

At this point, protocol information may be exchanged between the TSU's as control tuples in an information packet. These packets are treated as data-bearing packets (even though they may carry only control tuple information) and hence the ordinary error control procedures are used for the transmission of those packets.

After the exchange of the initial protocol information, the transmission of asynchronous data begins. The ten bit data characters originated at the terminal are then applied to the terminal side TSU. The TSU reformats the data, as explained above. The control information is then added, which comprises a control tuple field, if any, extension field, if any, packet control field, error control field, and flag/abort field.

The packet control field is divided into two sections, a packet number sent and a packet number received. The packet number sent (PS) is based on an end-around memory of eight positions. Hence, the packet number sent will always be 0 through 7. Initially, the packet number sent and received registers will both be zero. The characters acquired by the terminal TSU are stored in buffer memory and identified according to packet. Each packet is assigned a sequential number and this number is the packet sent (PS) number. The packet received (PR) number is the number of the last packet which has been received correctly from the remote TSU. The packets identified in memory by the packet sent number are retained in memory until they have been acknowledged by the receiving TSU.

The transmitted packets have no header information, and thus, the 7-tuple data is transmitted to the modem as soon as the reformatting has been accomplished, before the packet is completely formed. By the time the flag field is added to the packet, in fact, the 7-tuple data is already well out on the transmission line and may even be already received by the remote TSU. This is an advantage in communications systems using human operators, where delays caused by waiting for complete packets prior to transmission can be frustrating.

As the receiving TSU is receiving the packet, it will search through the data until it recognizes the flag sequence indicating the end of the packet. It will then temporarily store the packet, while it is performing the error check on the rest of the packet. It will also check the packet sent number and the packet receive number, as well as the extension field, if any, and the control tuple fields, if any, for further protocol information. If there is no error found in the received packet, the 7-tuple data is reformatted into ten bit characters with start and stop bits and a parity bit, and then delivered to the host equipment in exactly the same form as originated by the terminal equipment.

At this point, the host TSU may have data to send to the terminal side TSU or it may send just an acknowledgement of the correct receipt of the transmission from the terminal TSU. The host TSU thus becomes a sending TSU and the terminal TSU becomes the receiving TSU. With full duplex communication, of course, which the TSUs are capable of, information can be moving in both directions at once. Data is formatted by the host side TSU for transmission to the terminal side TSU in exactly the same way as by the terminal TSU.

The packet control numbers will reflect the last correctly received packet, in the PR subfield, and the sequential position of the packet being sent. If the packet being sent by the host side TSU is the first one to be transmitted, and the host side TSU has just verified the first packet from the terminal side TSU, both the PS and PR subfields will be one. The host side TSU-originated packet will then be transmitted to the terminal side TSU, which, upon recognizing the one in the PR subfield, will know that that packet arrived error-free and hence, that the memory space occupied by that data in its transmit buffer can be released.

This procedure of transmission and acknowledgement will continue until there is an error discovered by one of the TSU's. At this point, a flag will be placed in the negative acknowledgement (NAK) subfield of the extension field area of the next packet sent back to the originating TSU. Upon transmission of the NAK and recognition by the originator of the packet containing the error, the data from the packet containing the error and all following data will be called out of memory and retransmitted. Upon subsequent acknowledgement, the storage for that data will be released.

This procedure of ACK, NAK and retransmission continues until the communication has been completed. At this point, the link will undergo a disconnect procedure, in which a data-free, but packet control incremented, packet containing control tuple information is transmitted and acknowledged in the usual way. The control tuple will be a code indicating a disconnect request. Upon receipt of this code, the receiving TSU will send a disconnect response. Upon receipt of the disconnect response by the sending TSU, the sending TSU will send its own disconnect response signal back to the receiving TSU and the link will then go down, and both TSU's will reset.

Hence, a method has been described which provides a capability for implementing sophisticated error control techniques in asynchronous communications. The apparatus used is transparent to the terminal/host and line equipment, and requires no modification of existing equipment or transmission lines. Furthermore, it adds an error control capability without in any way reducing the data capacity of the communication system.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. An asynchronous digital data communication system for use with two digital data communication stations, both adapted to operate asynchronously with digital characters made up of first control bits and a predetermined number of data bits, comprising:
- a first terminal and a second terminal operable with the two stations, respectively, and means operatively associated with said first terminal and said second terminal providing a communication channel therebetween;
- said first terminal including station input means operable with one station for asynchronously receiving a first character therefrom and combining only the data bits of said first character with string control bits to form a first information bit string, section means operatively associated with said station input means for dividing said first information bit string into sections, each having a number of bits equal to one or more than said predetermined number, and channel output means operatively associated with said section means for adding section control bits to each section to form a digital word, and then asynchronously transmitting said digital word via said communication channel;
- said second terminal including channel input means operatively associated with said communication channel for asynchronously receiving said digital word and then removing said section control bits therefrom to form a second information bit string, reformatting means operatively associated with said channel input means for combining only the data bits of said second information bit string with second control bits identical to said first control bits to form a second character identical to said first character, and station output means operatively associated with said reformatting means and operable with the other station for asynchronously presenting said second character to said other station.

2. An asynchronous digital data communication system for use with two digital data communication stations, both adapted to operate asynchronously with digital characters made up of first control bits and a predetermined number of data bits, comprising:
- a first terminal and a second terminal operable with the two stations, respectively, and means operatively associated with said first terminal and said second terminal providing a communication channel therebetween, each terminal including;
- (A) FOR TRANSMITTING TO THE OTHER TERMINAL—station input means operable with one station for asynchronously receiving a first character therefrom and combining only the data bits of said first character with string control bits to form a first information bit string, section means operatively associated with said station input means for dividing said first information bit string into sections, each having a number of bits equal to one more than said predetermined number, and channel output means operatively associated with said section means for adding section control bits to each section to form a digital word, and then asynchronously transmitting said digital word via said communication channel; and
- (B) FOR RECEIVING FROM THE OTHER TERMINAL—channel input means operatively associated with said communication channel for asynchronously receiving said digital word and then removing said section control bits therefrom to form a second information bit string, reformatting means operatively associated with said channel input means for combining only the data bits of said second information bit string with second control bits identical to said first control bits to form a second character identical to said first character, and station output means operatively associated with said reformatting means and operable with the other station for asynchronously presenting said second character to said other station.

3. The system of claim 1 or 2 wherein,
said station input means include memory means operatively associated with said section means for storing the data bits and a portion of said string control bits as a storage bit string,
said reformatting means include error control means responsive to said string control bits for determining the correctness of said second information bit string, and for transmitting (A) a first acknowledgement signal indicative that said second information bit string is correct, or (B) a second acknowledgement signal indicative that said second information bit string is incorrect, and
wherein said channel output means include means operatively associated with said memory means and responsive to said first acknowledgement signal for terminating storage of said storage bit string, and responsive to said second acknowledgement signal for initiating a transfer of said storage bit string from said memory means to said section means, whereupon the data bits may be re-transmitted to said second terminal as such digital words.

4. The system of claim 1 or 2 wherein,
said station input means include means for forming said string control bits wherein said string control bits include a required bit sequence and may include an optional bit sequence,
said channel input means include means for detecting the presence of said optional bit sequence when the total number of bits in said second information bit string is other than the sum of (A) the number of bits in said required bit sequence and (B) an integral multiple of said predetermined number.

5. The system of claim 1 or 2 wherein, said station input means include means for encoding the data bits forming said first information bit string, and said channel input means include means for decoding the data bits forming said second information bit string.

6. A terminal for presenting digital words to a communication channel and operable with a digital data communication station that is adapted to operate asychronously with digital characters made up of first control bits and a predetermined number of data bits, the terminal comprising:
(A) FOR TRANSMITTING—station input means operable with the station for asynchronously receiving a first character therefrom and combining only the data bits of said first character with string control bits to form a first information bit string;
section means operatively associated with said station input means for dividing said first information bit string into sections, each having a number of bits equal to one more than said predetermined number;
channel output means operatively associated with said section means for adding section control bits to each section to form a digital word, and then asynchronously presenting said digital word to the communication channel; and
(B) FOR RECEIVING—channel input means operatively associated with the communication channel for asynchronously receiving said digital word and then removing said section control bits therefrom to form a second information bit string;
reformatting means operatively associated with said channel input means for combining only the data bits of said second information bit string with second control bits identical to said first control bits to form a second character identical to said first character; and
station output means operatively associated with said reformatting means and operable with the station for asynchronously presenting said second character to said station.

7. The terminal of claim 6 wherein,
said station input means include memory means operatively associated with said section means for storing the data bits and a portion of said string control bits as a storage bit string,
said reformatting means include error control means responsive to said string control bits for determining the correctness of said second information bit string, and for transmitting (A) a first acknowledgement signal indicative that said second information bit string is correct, or (B) a second acknowledgement signal indicative that said second information bit string is incorrect, and wherein said channel output means include means operatively associated with said memory means and reponsive to said first acknowledgement signal for terminating storage of said storage bit string, and responsive to said second acknowledgement signal for initiating a transfer of said storage bit string from said memory means to said section means, whereupon the data bits may be re-transmitted as such digital words.

8. The terminal of claim 6 wherein,
said station input means include means for forming said string control bits wherein said string control bits include a required bit sequence and may include an optional bit sequence,
said channel input means include means for detecting the presence of said optional bit sequence when the total number of bits in said second information bit string is other than the sum of (A) the number of bits in said required bit sequence and (B) an integral multiple of said predetermined number.

9. The terminal of claim 6 wherein, said station input means include means for encoding the data bits forming said first information bit string, and said channel input means include means for decoding the data bits forming said second information bit string.

10. A terminal for presenting digital words to a communication channel and operable with a digital data communication station that is adapted to operate asynchronously with digital characters made up of first control bits and a predetermined number of data bits, the terminal comprising:
station input means operable with the station for asynchronously receiving a first character therefrom and combining only the data bits of said first character with string control bits to form a first information bit string;
section means operatively associated with said station input means for dividing said first information bit string into sections, each having a number of bits equal to one more than said predetermined number; and
channel output means operatively associated with said section means for adding section control bits to each section to form a digital word, and then asynchronously presenting said digital word to the communication channel.

11. The terminal of claim 10 wherein, said station input means include means for forming said string control bits wherein said string control bits include a required bit sequence and may include an optional bit sequence such that the presence of said optional bit sequence is indicated by making the total number of bits in said first information bit string is other than the sum of (A) the number of bits in said required bit sequence and (B) an integral multiple of said predetermined number.

12. The terminal of claim 10 wherein, said station input means include means for encoding the data bits forming said first information bit string.

13. A terminal for receiving digital words from a communication channel and operable with a digital data communication station adapted to operate asynchronously with digital characters made up of first control bits and a predetermined number of data bits, said digital words including section control bits and sections, each section having a number of bits equal to one more than said predetermined number and being a portion of a first information bit string, said first information bit string containing string control bits and only the data bits of a first digital character, the terminal comprising:

channel input means operatively associated with said communication channel for asynchronously receiving said digital word and then removing said section control bits therefrom to form a second information bit string, reformatting means operatively associated with said channel input means for combining only the data bits of said second information bit string with second control bits identical to said first control bits to form a second character identical to said first character, and station output means operatively associated with said reformatting means and operable with the other station for asynchronously presenting said second character to the station.

14. A method for asynchronous digital data communication for use with two digital data communication stations both adapted to operate asynchronously with digital characters made up of first control bits and a predetermined number of data bits, the method comprising the steps of:

asynchronously receiving a first character from one station;

combining only the data bits of said first character with string control bits to form a first information bit string;

dividing said first information bit string into sections, each having a number of bits equal to one more than said predetermined number;

adding section control bits to each section to form a digital word;

asynchronously transmitting said digital word;

asynchronously receiving said digital word and then removing said section control bits therefrom to form a second information bit string;

combining only the data bits of said second information bit string with second control bits identical to said first control bits to form a second character identical to said first character; and asynchronously presenting said second character to the other station.

15. A method for asynchronous digital data communication for use with two digital data communication stations both adapted to operate asynchronously with digital characters made up of first control bits and a predetermined number of data bits, the method at each station comprising the steps of:

(A) FOR TRANSMITTING— asynchronously receiving a first character from one station;

combining only the data bits of said first character with string control bits to form a first information bit string;

dividing said first information bit string into sections, each having a number of bits equal to one more than said predetermined number;

adding section control bits to each section to form a digital word;

asynchronously transmitting said digital word;

(B) FOR RECEIVING—asynchronously receiving said digital word, and then removing said section control bits therefrom to form a second information bit string;

combining only the data bits of said second information bit string with second control bits identical to said first control bits to form a second character identical to said first character; and asynchronously presenting said second character to the other station.

16. The method of claim 14 or 15, including;

storing the data bits and a portion of said string control bits as a storage bit string, determining the correctness of said second information bit string based on said string control bits, and transmitting (A) a first acknowledgement signal indicative that said second information bit string is correct, or transmitting (B) a second acknowledgement signal indicative that said second information bit string is incorrect, and responding to said first acknowledgement signal to terminate storage of said storage bit string, or responding to said second acknowledgement signal to initiate dividing said storage bit string into sections, whereupon the data bits may be re-transmitted as such digital words.

17. The method of claim 14 or 15, including;

forming said string control bits wherein said string control bits include a required bit sequence and may include an optional bit sequence, indicating the presence of said optional bit sequence by including a number of bits in said optional bit sequence such that the total number of bits in said second information bit string is other than the sum of (A) the number of bits in said required bit sequence and (B) an integral multiple of said predetermined number.

18. The method of claim 14 or 15, including;

encoding the data bits forming said first information bit string, and decoding the data bits forming said second information bit string.

19. A method for asynchronous digital data communication for use with a digital data communication station adapted to operate asynchronously with digital characters made up of first control bits and a predetermined number of data bits, the method comprising the steps of:

(A) FOR TRANSMITTING— asynchronously receiving a first character from the station;

combining only the data bits of said first character with string control bits to form a first information bit string;

dividing said first information bit string into sections, each having a number of bits equal to one more than said predetermined number;

adding section control bits to each section to form a digital word;

asynchronously transmitting said digital word;

(B) FOR RECEIVING—asynchronously receiving said digital word, and then removing said section control bits therefrom to form a second information bit string;

combining only the data bits of said second information bit string with second control bits identical to said first control bits to form a second character identical to said first character; and asynchronously presenting said second character to the station.

20. The method of claim 19, including;

storing the data bits and a portion of said string control bits as a storage bit string, determining the correctness of said second information bit string based on said string control bits, and transmitting (A) a first acknowledgement signal indicative that said second information bit string is correct, or transmitting (B) a second acknowledgement signal indicative that said second information bit string is incorrect, and responding to said first acknowledgement signal to terminate storage of said storage bit string, or responding to said second acknowledgement signal to initiate dividing said storage bit string into sections, whereupon the data bits may be re-transmitted as such digital words.

21. The method of claim 19, including;

forming said string control bits wherein said string control bits include a required bit sequence and may include an optional bit sequence, indicating the presence of said optional bit sequence by including a number of bits in said optional bit sequence such that the total number of bits in said second information bit string is other than the sum of (A) the number of bits in said required bit sequence and (B) an integral multiple of said predetermined number.

22. The method of claim 19, including;

encoding the data bits forming said first information bit string, and decoding the data bits forming said second information bit string.

23. A method for asynchronous digital data transmission for use with a digital data communication station adapted to operate asychronously with digital characters made up of first control bits and a predetermined number of data bits, the method comprising the steps of:

asynchronously receiving a first character from the station;

combining only the data bits of said first character with string control bits to form a first information bit string;

dividing said first information bit string into sections, each having a number of bits equal to one more than said predetermined number;

adding section control bits to each section to form a digital word;

asynchronously transmitting said digital word.

24. The method of claim 23, including;

forming said string control bits wherein said string control bits include a required bit sequence and may include an optional bit sequence, indicating the presence of said optional bit sequence by including a number of bits in said optional bit sequence such that the total number of bits in said first information bit string is other than the sum of (A) the number of bits in said required bit sequence and (B) an integral multiple of said predetermined number.

25. The method of claim 23, including;

encoding the data bits forming said first information bit string.

26. A method for receiving digital words for use with a digital data communication station adapted to operate asynchronously with digital characters made up of first control bits and a predetermined number of data bits, said digital words including section control bits and sections, each section having a number of bits equal to one more than said predetermined number and being a portion of a first information bit string, said first information bit string containing string control bits and only the data bits of a first digital character, the method comprising the steps of:

asynchronously receiving said digital word, and then removing said section control bits therefrom to form a second information bit string;

combining only the data bits of said second information bit string with second control bits identical to said first control bits to form a second character identical to said first character; and asynchronously presenting said second character to the station.

* * * * *

UNITED STATES PATENT AND TRADEMARK OFFICE
CERTIFICATE OF CORRECTION

PATENT NO. : 4,377,862

DATED : March 22, 1983

INVENTOR(S) : James S. Koford, William C. Jensen, Barry B. Woo and Clifford Bamford It is certified that error appears in the above-identified patent and that said Letters Patent are hereby corrected as shown below:

Title page, after "Inventors: James S. Koford, Sunnyvale; William C. Jensen, Palo Alto; Barry B. Woo, Sunnyvale," and before "all of Calif." add: --Clifford Bamford, Sunnyvale--.

Signed and Sealed this

Twenty-first Day of February 1984

[SEAL]

Attest:

GERALD J. MOSSINGHOFF

Attesting Officer

Commissioner of Patents and Trademarks